(12) United States Patent
Foltin

(10) Patent No.: US 10,870,428 B2
(45) Date of Patent: Dec. 22, 2020

(54) METHOD AND DEVICE FOR CONTROLLING A VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 16/310,525

(22) PCT Filed: Jun. 20, 2017

(86) PCT No.: PCT/EP2017/065132
§ 371 (c)(1),
(2) Date: Dec. 17, 2018

(87) PCT Pub. No.: WO2018/001799
PCT Pub. Date: Jan. 4, 2018

(65) Prior Publication Data
US 2019/0337508 A1 Nov. 7, 2019

(30) Foreign Application Priority Data

Jun. 28, 2016 (DE) .................. 10 2016 211 587

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 40/09* (2013.01);
(Continued)

(58) Field of Classification Search
CPC .... B60W 30/09; B60W 30/095; B60W 30/08; B60W 40/09; B60W 2540/30; B62D 15/0265; G08G 1/16
See application file for complete search history.

(56) References Cited

U.S. PATENT DOCUMENTS 8,630,762 B2 * 1/2014 Staempfle ............. B60W 50/14
701/23
9,891,625 B1 * 2/2018 Kahn ................... G05D 1/0214
(Continued)

FOREIGN PATENT DOCUMENTS

CN 104597910 A 5/2015
DE 102011081159 A1 2/2013
(Continued)

OTHER PUBLICATIONS

International Search Report dated Oct. 4, 2017 of the corresponding International Application PCT/EP2017/065132 filed Jun. 20, 2017.
(Continued)

*Primary Examiner* — Michael J Zanelli
(74) *Attorney, Agent, or Firm* — Norton Rose Fulbright US LLP; Gerard A. Messina

(57) ABSTRACT

A method for controlling a vehicle includes reading in a collision signal that represents an imminent collision of the vehicle with at least one collision object, selecting, based on the collision signal, an emergency trajectory that represents a human driving behavior associated with a human driver, and outputting a corresponding control signal to guide the vehicle along the emergency trajectory.

11 Claims, 4 Drawing Sheets

(51) Int. Cl.
*B60W 40/09* (2012.01)
*B62D 15/02* (2006.01)
*G08G 1/16* (2006.01)

(52) U.S. Cl.
CPC .......... *B62D 15/0265* (2013.01); *G08G 1/16* (2013.01); *B60W 2540/30* (2013.01)

(56) References Cited

U.S. PATENT DOCUMENTS

| | | |
|---|---|---|
| 10,055,652 B2 * | 8/2018 | Myers .................. G06K 9/6274 |
| 2014/0244105 A1 | 8/2014 | Dariush et al. |
| 2014/0330479 A1 | 11/2014 | Dolgov et al. |
| 2016/0001775 A1 * | 1/2016 | Wilhelm ............... B60W 40/04 701/25 |
| 2016/0272172 A1 * | 9/2016 | Lee ......................... B60T 8/171 |
| 2018/0292830 A1 * | 10/2018 | Kazemi ............. G01C 21/3484 |

FOREIGN PATENT DOCUMENTS

| | | |
|---|---|---|
| DE | 102014202385 A1 | 8/2015 |
| EP | 2990290 A1 | 3/2016 |
| JP | 2012226437 A | 11/2012 |
| JP | 2015219830 A | 12/2015 |
| JP | 2016015142 A | 1/2016 |

OTHER PUBLICATIONS

Patrick Lin: "The Robot Car of Tomorrow May Just Be Programmed to Hit You," Jun. 5, 2014, XPO55408256.

\* cited by examiner

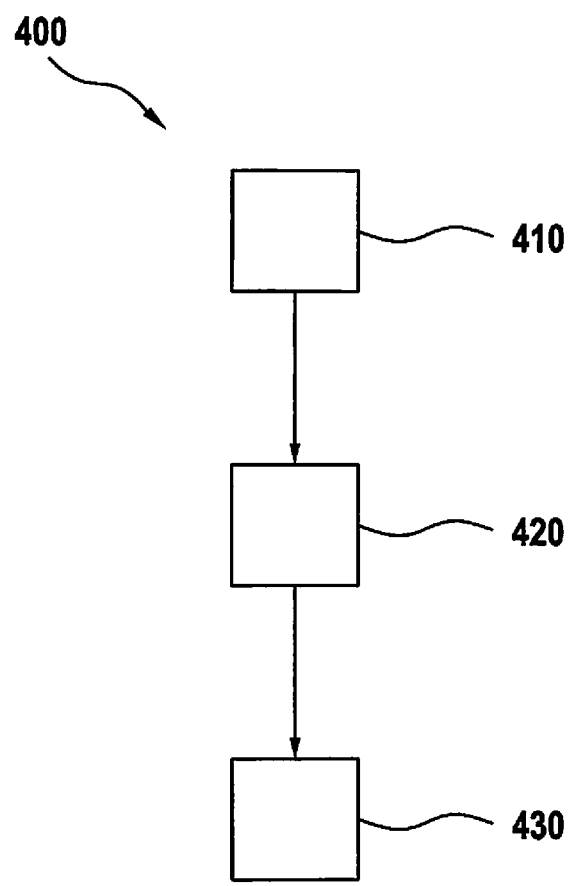

METHOD AND DEVICE FOR CONTROLLING A VEHICLE

CROSS-REFERENCE TO RELATED APPLICATIONS

The present application is the national stage of International Pat. App. No. PCT/EP2017/065132 filed Jun. 20, 2017, and claims priority under 35 U.S.C. § 119 to DE 10 2016 211 587.1, filed in the Federal Republic of Germany on Jun. 28, 2016, the content of each of which are incorporated herein by reference in their entireties.

BACKGROUND

Highly automated vehicles are able to take over the driving task from a driver. To that end, the vehicle should also react correctly in critical situations, without intervention by the driver. For example, the driving behavior of the vehicle can be designed to be suitably defensive, in order to avoid accidents with other road users.

SUMMARY

Against this background, the present invention introduces a method for controlling a vehicle, a device which uses this method, and a corresponding computer program.

According to an example embodiment of the present invention, a method for controlling a vehicle includes: reading-in a collision signal which represents an imminent collision of the vehicle with at least one collision object; selecting an emergency trajectory using the collision signal, the emergency trajectory representing a human driving behavior associated with a human driver; and outputting a control signal to guide the vehicle along the emergency trajectory.

For example, a vehicle can be understood to be a partially, highly, or fully automated motor vehicle. A collision signal can be understood to be a signal generated using a driving-environment sensor system of the vehicle. An imminent collision can be understood to be an immediately impending, especially unavoidable collision. A collision object can be understood to be another road user or an object such as a barrier, a building, a tree, or the like in the driving environment of the vehicle. For instance, an emergency trajectory can be understood to be a trajectory by which, in the case of an imminent collision, damage able to be caused by the collision can be reduced. In principle, it can also be understood to be a trajectory which changes the specific situation for the worse, for instance, if the reaction of the reference driver in the situation in question is worse than the original trajectory. Thus, an emergency trajectory can be understood to be a trajectory which makes a course of an accident human, insofar as it includes the errors that a person can make in an accident situation. For example, the human driver can be a taxi driver or truck driver. A control signal can be understood to be a signal for controlling a steering system, a brake system, or an engine of the vehicle, for instance.

The approach presented here is based on the recognition that a predefined human reaction during accidents, especially during unavoidable accidents, can be used in the case of an imminent collision in order to control a highly automated vehicle in conformity with a human driving behavior. It can thus be ensured that the vehicle reaction corresponds to a human reaction.

According to an example embodiment, in the selection step, the emergency trajectory can be selected from a quantity of reference trajectories, using the collision signal. Each of the reference trajectories can represent a human driving behavior associated in each case with a different reference driver. A reference trajectory can be a trajectory that can be ascribed to an actual reaction of a reference driver in a specific traffic situation. For instance, the reference trajectories can have been determined by suitable experiments with human drivers. The number of emergency trajectories available for selection can thereby be increased.

According to a further example embodiment, the method can include a preselecting step, in which the reference trajectories are preselected cyclically one after the other. In this case, in the selection step, the preselecting can be stopped using the collision signal in order to select as the emergency trajectory, a reference trajectory preselected upon stopping. For example, a cyclical preselection can be understood to be a cyclical count-through of the individual reference trajectories with the aid of a suitable counter. Thus, the emergency trajectory can be selected as a function of the random moment the collision signal is generated or read in.

In a further example embodiment, in the preselecting step, the reference drivers are preselected cyclically one after the other. The preselected reference driver can be assigned a quantity of reference trajectories, from which the emergency trajectory can be selected according to the prevailing driving-environment conditions.

If not all reference drivers have driven in all accident situations, then the number of reference trajectories with respect to a specific accident situation is not equal. It is then advantageous if the quantity of reference trajectories belonging to the specific accident situation is determined, and the emergency trajectory is selected from the counter, e.g., by modulo operation.

According to a further example embodiment, in the selection step, the emergency trajectory can be selected randomly from the quantity of reference trajectories. It can thus be ensured that all reference trajectories which match the accident situation are treated with the same priority.

For example, in the read-in step, a starting moment at which the vehicle and/or at least one component of the vehicle is/are activated can be read in, and in the selection step, the emergency trajectory can be selected from the quantity of reference trajectories using the starting moment. For example, a starting moment can be understood to be a moment of ignition, a moment of an engine start, a moment of a navigation start, for instance, by the input of a navigation destination, a moment of an autopilot start, i.e., an automated travel of the vehicle, a moment a seat of the vehicle is occupied or a moment the vehicle is unlocked. Thus, the emergency trajectory can be selected as a function of the random moment the ignition of the vehicle is activated.

In addition, in the selection step, a trajectory that represents a human driving behavior associated with a commercial driver can be selected as the emergency trajectory. For instance, a commercial driver can be understood to be a taxi driver or a truck driver. The reliability of the method can be improved by this example embodiment.

It is advantageous if, in the read-in step, at least one further reference trajectory is read in via an interface to at least one further vehicle and/or to an external data-processing device. For example, the interface can be a car-to-infrastructure communication interface to a central server that can be connected to the vehicle and the further vehicle alike, or a car-to-car communication interface for the direct communication between the vehicle and the further vehicle. The further reference trajectory can represent a human driving behavior associated with a further reference driver. Accordingly, in the selection step, the further reference trajectory can be selected as the emergency trajectory, using the collision signal. In this manner, the reference trajectories of various vehicles can be selected with approximately equal frequency as emergency trajectories.

The negotiation of the available human driver models can also be limited locally, so that the drivers used are distributed equally over an area, comparable to taxi drivers.

It is also advantageous if, in an evaluation step, the collision signal is evaluated in order to discern whether the collision is unavoidable. Additionally or alternatively, the collision signal can be evaluated in order to discover whether the collision object is a person. Accordingly, in the selection step, the emergency trajectory can be selected if in the evaluation step, it turns out that the collision is unavoidable or the collision object is a person. In this manner, it can be ensured that the emergency trajectory is selected only in the case of an unavoidable collision or in the case of a collision with a human collision object.

According to a further example embodiment, in the read-in step, driving-environment information representing a driving environment of the vehicle can also be read in. In this case, in an analyzing step, the driving-environment information can be analyzed in order to detect a change of a location or, additionally or alternatively, a speed and/or orientation of the collision object relative to the vehicle. Correspondingly, in the output step, a further control signal can be output in order, as a function of the change, to guide the vehicle onto a trajectory deviating from the emergency trajectory. It is therefore possible to react adequately to changes in the progression of a collision which indicate, for example, an avoidance of the collision because of a suitable reaction by the opposing party in the accident.

For instance, in the output step, the further control signal can be output if the change is such that the collision between the vehicle and the collision object is avoided. As a result, unnecessary further travel of the vehicle along the emergency trajectory can be prevented.

For example, this method can be implemented in software or hardware or in a mixed form of software and hardware, e.g., in a control unit.

According to an example embodiment, a device is designed to carry out, control, or implement the steps of a method described herein, in suitable units. The object of the present invention can be achieved quickly and efficiently by this embodiment of the invention in the form of a device, as well.

To that end, the device can have at least one arithmetic logic unit for the processing of signals or data, at least one memory unit for storing signals or data, at least one interface to a sensor or an actuator for reading in sensor signals from the sensor or for the output of data signals or control signals to the actuator, and/or at least one communication interface for the read-in or output of data which are embedded into a communication protocol. For example, the arithmetic logic unit can be a signal processor, a microcontroller or the like, while the memory unit can be a flash memory, an EPROM or a magnetic memory unit. The communication interface can be designed to read in or output data in wireless and/or conducted fashion, a communication interface which is able to read in or output conducted data having the capability to read in this data electrically or optically from a corresponding data-transmission line, for example, or output it into a corresponding data-transmission line.

In the present case, a device can be understood to be an electrical device which processes sensor signals and outputs control signals and/or data signals as a function thereof. The device can have an interface which can be implemented in hardware and/or software. If implemented in hardware, the interfaces can be part of what is referred to as a system ASIC, for example, that includes a wide variety of functions of the device. However, it is also possible that the interfaces are separate integrated circuits or are made up at least partially of discrete components. If implemented in software, the interfaces can be software modules which are present on a microcontroller, for example, in addition to other software modules.

In one advantageous development, the vehicle is controlled by way of the device. To that end, the device is able to access suitable sensor signals such as pressure-, acceleration-, steering-angle- or driving-environment sensor signals of the vehicle. The control is carried out via suitable actuators such as steering or brake actuators or an engine control unit. A control of passenger protection devices of the vehicle using the sensor signals is also conceivable.

According to an example embodiment, a computer-program product or computer program having program code that can be stored on a machine-readable carrier or storage medium such as a semiconductor memory, a hard disk memory, or an optical memory is usable to carry out, implement, and/or control the steps of the method according to one of the example embodiments described herein, especially when the program product or program is executed on a computer or a device.

Example embodiments of the present invention are explained in greater detail in the following description and are represented in the drawings in which the same or similar reference numerals are used for similarly functioning elements shown in the various figures, repeated descriptions of these elements being omitted.

BRIEF DESCRIPTION OF THE DRAWINGS

FIG. 4 is a flowchart of a method according to an example embodiment of the present invention.

DETAILED DESCRIPTION

Figure 1:
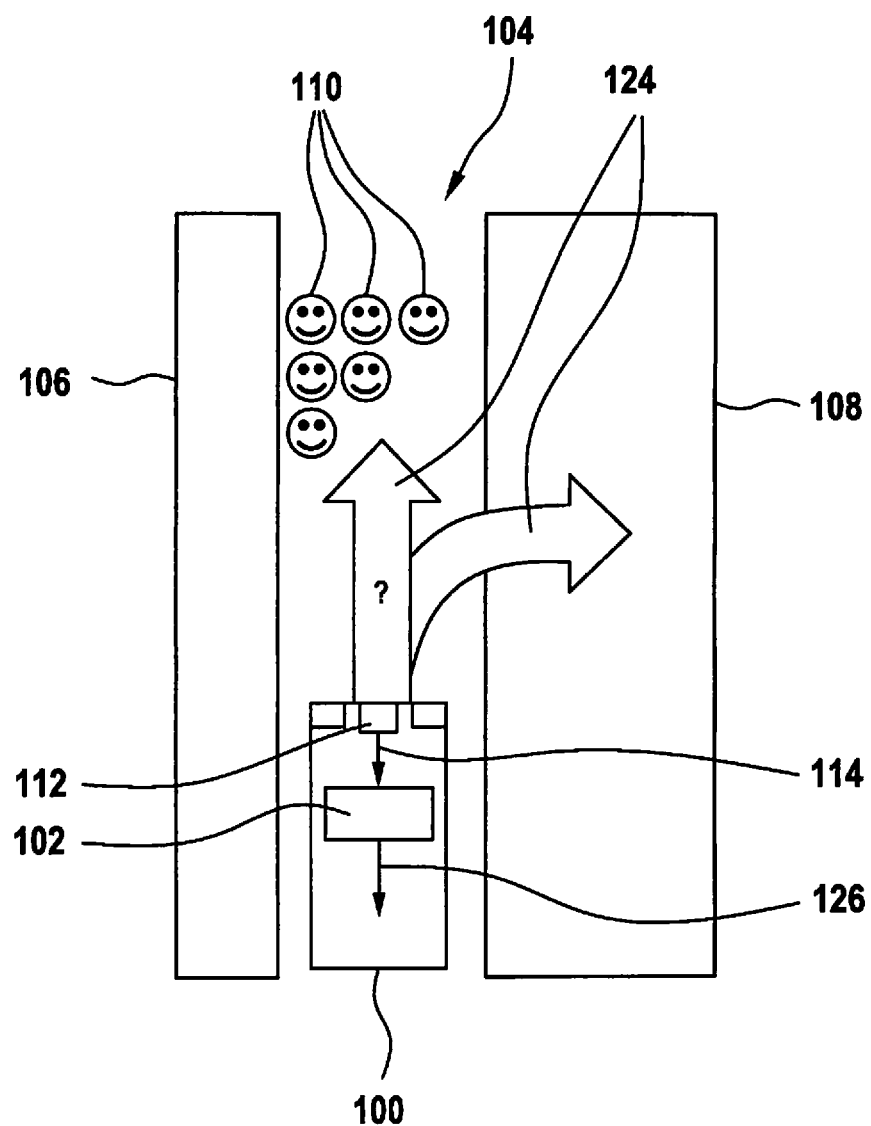
FIG. 1 schematically represents a vehicle having a device in a critical traffic situation, according to an example embodiment of the present invention.

FIG. 1 shows a schematic representation of a vehicle 100 having a device 102 according to an example embodiment, in a critical traffic situation. Vehicle 100, here a highly automated vehicle, is traveling on a relatively narrow road 104 that is bounded on the left side by a barrier 106, for instance, a rock face. To the right of road 104 is a precipice 108. Vehicle 100 is approaching several collision objects 110, for instance, a group of pedestrians.

According to this example embodiment, device 102 is designed, using driving-environment information 114 provided by a driving-environment sensor 112 of vehicle 100, to recognize an imminent collision between vehicle 100 and collision objects 110, and, in response to a recognized collision, select an emergency trajectory 124 from a quantity of reference trajectories, each of which represents a human driving behavior associated in each case with a different reference driver. Two possible courses of emergency trajectory 124 are drawn in as arrows in FIG. 1 by way of example. Emergency trajectory 124 represents a previously determined longitudinal or transverse motion of vehicle 100. The reference trajectories are stored in device 102, for example. Alternatively, device 102 is designed to receive the reference trajectories via a suitable interface from an external unit like from another vehicle, for instance, and/or from an infrastructure, e.g., a server, located outside of the vehicle.

To guide vehicle 100 along emergency trajectory 124, device 102 outputs a corresponding control signal 126. Control signal 126 is used, for instance, to control a steering system, a brake system or an engine of vehicle 100.

For example, in the traffic situation shown in FIG. 1, vehicle 100 is no longer able to stop in time before reaching the appearing pedestrian group. In the context of highly automated driving, this results in a dilemma which becomes clear by the following consideration: should vehicle 100 drive into the pedestrian group, or instead, sacrifice itself and its passengers by heading for precipice 108, to thus keep the number of victims as small as possible?

To resolve such ethical questions, surveys are currently being conducted about what the correct decision should be in various traffic situations. In so doing, the traffic situation is portrayed to the study participants with the aid of a sketch, for instance, and they are supposed to decide on one reaction appropriate for the traffic situation.

As a result, it turns out that normally the minimization of victims is preferred, except when the study participant is sitting in the vehicle driving in automated fashion. The survey of various people is thus unable to lead to the resolution of the dilemma, since as a consequence of evolution, humans have the tendency to protect themselves before all others. If the study participant assumes the role of the pedestrian, then the study participant wants the sacrifice of the automated vehicle and therefore the possibility to protect the study participant. On the other hand, if the study participant assumes the role of the vehicle occupant, then conversely, the study participant wishes for the sacrifice of the pedestrians.

Currently, there is still no universal answer which could solve the problem of an ethical behavior of automated vehicles. However, there is the opinion that whoever controls the autonomously moving vehicle is also responsible for its behavior. This pertains equally to original equipment manufacturers, suppliers, as well as programmers who convert the behavior of the vehicles into the form of corresponding programs.

The approach described here now provides a method in which an unavoidable accident situation is recognized and classified by device 102. Device 102 subsequently selects one reaction in the form of a trajectory suitable for this accident situation, from a quantity of possible reactions. The trajectory was driven in beforehand by an experienced driver, previously also called reference driver, e.g., by a taxi driver. In this sense, the reaction of autonomous vehicle 100 can be regarded as human. The decision about the reaction of vehicle 100 is thus not made by the vehicle manufacturer, but rather corresponds to the behavior of an actual human driver.

In a way, the reference driver can be compared to an autopilot, inasmuch as the occupant of vehicle 100 has no direct influence on the reference driver, and in the figurative sense, the reference driver can have been acquired by purchase. In particular, the reference drivers are experienced drivers who have a great deal of work-related driving experience. For example, instead of a taxi driver, a truck driver is also conceivable as reference driver, particularly if vehicle 100 is a truck.

Optionally, emergency trajectory 124 is adaptable by device 102 to specific circumstances, for instance, by scaling the braking behavior or steering behavior of vehicle 100 within a certain speed range. It is thereby possible to adapt emergency trajectory 124 to the precise traffic situation.

According to the example embodiment shown in FIG. 1, a number of previously recorded reference trajectories of various people (reference drivers) are available to device 102. In this context, device 102 randomly selects one of the people in order to trace his trajectory. The system reaction thus becomes even more human, since it is less predictable, but realistic.

A truly random selection of emergency trajectory 124 is achieved in a manner that date and time of a starting moment of vehicle 100, for instance, a terminal 15 signal, is utilized by device 102 in order to load one specific reference driver for the entire trip. Alternatively, device 102 can be designed to count through the reference drivers via a counter, for example, until the request for an emergency trajectory is made. Due to the randomness of the starting moment or accident moment, the reference driver whose trajectory is to be followed is selected truly randomly.

According to a further example embodiment, the selection of the reference driver is coordinated via a radio interface with other autonomous vehicles or, for example, with an infrastructure, e.g., a central server, so that the recorded reference trajectories are always used with the same or similar frequency within the identically assessed accident situation. This has the advantage that the vehicles are controlled by a mixture of different driving behaviors, which is close to the reality. Thus, for example, a certain selection of taxi drivers is available within a city. The situation is similar with the selection of the reference drivers or the reference trajectories associated with the reference drivers. In this context, the hiring or, technically expressed, the use of the specific reference driver is a matter of chance.

The dilemma shown in FIG. 1 is able to be resolved with the approach described here, in so far as a decision made by a human driver is adopted in the selection of emergency trajectory 124. At the same time, the solution is not necessarily optimized globally, for instance, by prioritizing the protection of the pedestrian group, but rather is oriented towards human behavior, which can also be optimized locally and therefore can prioritize the protection of the vehicle occupant.

If vehicle 100 in automated vehicle operation finds no accident-free trajectory, a trajectory currently being driven can also be maintained, for example, in the anticipation, perhaps, that the traffic situation will change in such a way that an accident-free trajectory can again be found. Alternatively, it is possible to change over to an emergency operating mode, for example, in which the lateral trajectory, i.e., the steering behavior, is maintained as planned, however, kinetic energy is reduced by an emergency-braking situation.

In the following, possible variants for the selection of reference drivers and reference trajectories are described once again in greater detail. In this connection, it is important to differentiate between the selection of the reference driver and the selection of the reference trajectories which pertain to a particular scene.

According to an example embodiment, the counter cyclically selects a different reference driver. As soon as the collision signal is received, the reference driver is determined (e.g., counter=5→mod3(5)=2→reference driver 2 in the case of a number of 3 reference drivers). The accident scene is selected deterministically on the basis of the driving-environment sensor signals.

According to another example embodiment, a reference trajectory is selected cyclically from the quantity of available reference trajectories. In this case, first of all, the accident scene is ascertained. The counter thereupon selects the corresponding reference trajectory as a function of the accident scene. The result is the same here as in the case of the random selection of the reference driver described above.

For example, if a first reference driver r1 has not driven in a scene B, perhaps because scene B was not available until a later time of development, then the simple count-through of the reference drivers is not optimal. If the counter now stands at 5 (=2) and scene B was selected, no emergency trajectory is able to be reenacted by a reference driver r2. Therefore, in the case of uneven distributions of reference trajectories, the scene is first classified, and the trajectory to be followed is then ascertained with the aid of the cyclical counter.

The reference driver is thus either selected randomly via a counter, for instance, with the accident scene being classified afterwards. Or the accident scene is classified first, the emergency trajectory subsequently being selected from the number of reference trajectories available for the accident scene.

Figure 2:
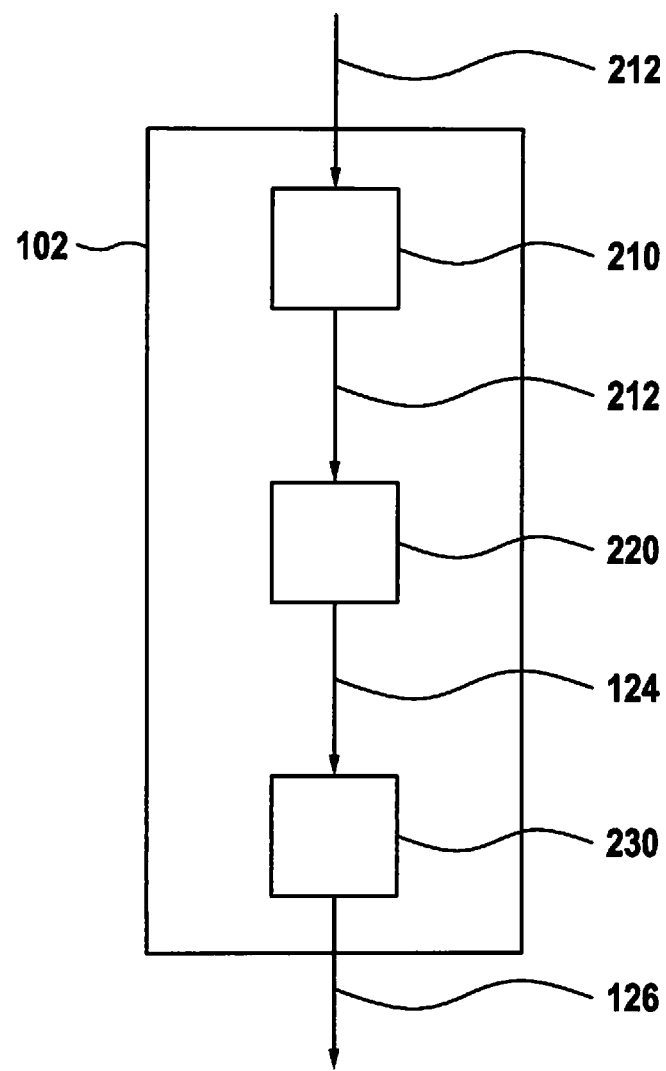
FIG. 2 schematically represents a device according to an example embodiment of the present invention.

FIG. 2 shows a schematic representation of a device 102 according to an example embodiment, for instance a device as described above with the aid of FIG. 1. Device 102 includes a read-in unit 210 for reading in a collision signal 212 that represents the imminent collision of the vehicle with the collision objects. For example, collision signal 212 is a signal generated using the driving-environment information. Read-in unit 210 passes on collision signal 212 to a selection unit 220 which is designed to select emergency trajectory 124, using collision signal 212. In particular, selection unit 220 is designed to select emergency trajectory 124 randomly from the quantity of reference trajectories. Selection unit 220 transmits emergency trajectory 124 to an output unit 230 designed to output control signal 126, based on emergency trajectory 124, for the corresponding control of the vehicle.

Figure 3:
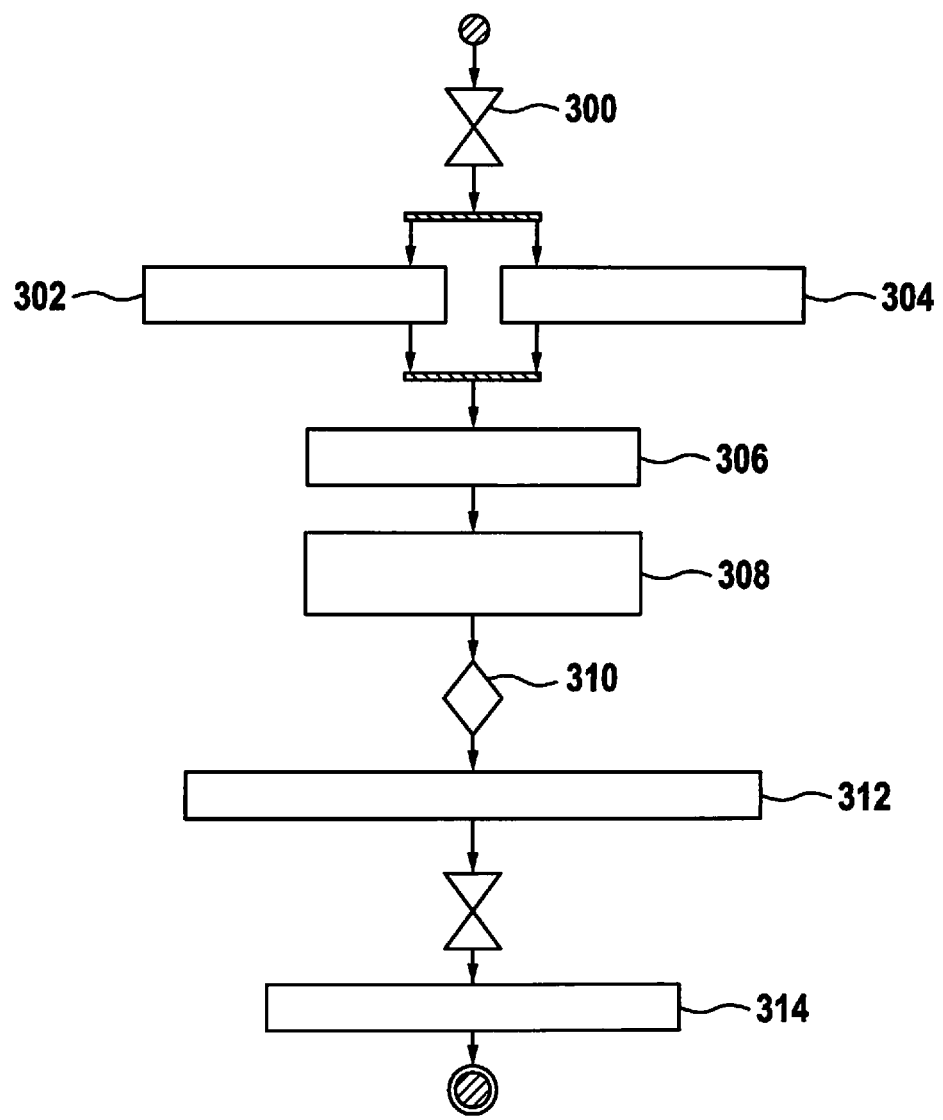
FIG. 3 is a schematic representation of a functional sequence for controlling a vehicle using a device according to an example embodiment of the present invention.

FIG. 3 shows a schematic representation of a functional sequence for controlling the vehicle using a device according to an example embodiment, for instance, a device as described above with reference to FIGS. 1 and 2. The functional sequence begins with a step 300, in which an unavoidable accident situation is awaited. Upon detection of such an unavoidable accident situation, the traffic situation is classified in a step 302. In addition, in a step 304, a reference driver is selected randomly. In a step 306, a desired accident trajectory, previously also referred to as emergency trajectory, is then read out. In a step 308, the emergency trajectory is followed. In a further step 310, the following of the emergency trajectory is discontinued if, in the meantime, the accident has clarified, for instance, because of a suitable reaction on the part of the opposing accident party. Optionally, in a step 312, further measures are taken to minimize the accident severity, e.g., by early triggering of airbags. After waiting for the accident, in another optional step 314, further measures, for instance, the automated transmission of an emergency call, are carried out.

FIG. 4 is a flowchart of a method 400 according to an example embodiment. For instance, method 400 for controlling a vehicle can be carried out in conjunction with a device described above with reference to FIGS. 1-3. In this case, in a step 410, the collision signal is read in. In a further step 420, the emergency trajectory attributable to the decision of a human driver is selected using the collision signal. Finally, in a step 430, the control signal is output in order to guide the vehicle along the emergency trajectory.

If an example embodiment includes an "and/or" link between a first feature and a second feature, this is to be read in such a way that the example embodiment according to an example embodiment has both the first feature and the second feature, and according to a further example embodiment, has either only the first feature or only the second feature.

What is claimed is:

1. A method for controlling a vehicle, the method comprising:
   obtaining a collision signal representing an imminent collision of the vehicle with at least one collision object;
   based on the collision signal, selecting an emergency trajectory representing a human driving behavior associated with a human driver;
   outputting a control signal to guide the vehicle along the selected emergency trajectory, wherein the selection of the emergency trajectory is from a plurality of reference trajectories that each represents a respective human driving behavior of a respective reference driver; and
   cycling through the reference trajectories one after another, wherein the selection of the emergency trajectory is performed by stopping the cycling upon obtaining the collision signal, with the one of the reference trajectories at which the cycling is stopped being selected as the selected emergency trajectory.

2. The method of claim 1, wherein the selection of the emergency trajectory is performed randomly from the plurality of reference trajectories.

3. The method of claim 1, wherein the collision signal is an indication of a starting moment at which at least one of the vehicle and at least one component of the vehicle is activated.

4. The method of claim 1, wherein a trajectory that represents a human driving behavior associated with a commercial driver is selected as the emergency trajectory.

5. The method of claim 1, further comprising evaluating the collision signal to determine whether the collision is unavoidable, wherein the emergency trajectory is selected responsive to the determination being that the collision is unavoidable.

6. The method of claim 1, further comprising:
   obtaining driving-environment information representing a driving environment of the vehicle;
   analyzing the obtained driving-environment information to detect a change of one or both of a location of the collision object relative to the vehicle and a speed of the collision object relative to the vehicle; and
   outputting a further control signal to, based on the detected change, guide the vehicle onto a trajectory deviating from the emergency trajectory.

7. The method of claim 6, wherein the output of the further control signal is performed responsive to a determination that the collision between the vehicle and the collision object is avoidable due to the change.

8. A method for controlling a vehicle, the method comprising:

obtaining a collision signal representing an imminent collision of the vehicle with at least one collision object;

based on the collision signal, selecting an emergency trajectory representing a human driving behavior associated with a human driver;

outputting a control signal to guide the vehicle along the selected emergency trajectory; and obtaining, via an interface to at least one of (a) one or more further vehicles and (b) an external data-processing device, a reference trajectory representing a human driving behavior associated with a further reference driver, the reference trajectory being selected as the emergency trajectory based on the collision signal.

9. A method for controlling a vehicle, the method comprising:

obtaining a collision signal representing an imminent collision of the vehicle with at least one collision object;

based on the collision signal, selecting an emergency trajectory representing a human driving behavior associated with a human driver;

outputting a control signal to guide the vehicle along the selected emergency trajectory; and evaluating the collision signal to determine whether the collision object is a person, wherein the emergency trajectory is selected responsive to the determination being that the collision object is a person.

10. A device for controlling a vehicle, the device comprising:

at least one interface; and a processor, wherein the processor is configured to:

obtain, via the at least one interface, a collision signal representing an imminent collision of the vehicle with at least one collision object;

based on the collision signal, select an emergency trajectory representing a human driving behavior associated with a human driver;

output, via the at least one interface, a control signal to guide the vehicle along the selected emergency trajectory, wherein the selection of the emergency trajectory is from a plurality of reference trajectories that each represents a respective human driving behavior of a respective reference driver; and cycle through the reference trajectories one after another, wherein the selection of the emergency trajectory is performed by stopping the cycling upon obtaining the collision signal, with the one of the reference trajectories at which the cycling is stopped being selected as the selected emergency trajectory.

11. A non-transitory computer-readable medium on which are stored instructions that are executable by a processor and that, when executed by the processor, cause the processor to perform a method for controlling a vehicle, the method comprising:

obtaining a collision signal representing an imminent collision of the vehicle with at least one collision object;

based on the collision signal, selecting an emergency trajectory representing a human driving behavior associated with a human driver;

outputting a control signal to guide the vehicle along the selected emergency trajectory, wherein the selection of the emergency trajectory is from a plurality of reference trajectories that each represents a respective human driving behavior of a respective reference driver; and cycling through the reference trajectories one after another, wherein the selection of the emergency trajectory is performed by stopping the cycling upon obtaining the collision signal, with the one of the reference trajectories at which the cycling is stopped being selected as the selected emergency trajectory.

* * * * *